US006999718B2

(12) United States Patent
Miyazaki

(10) Patent No.: US 6,999,718 B2
(45) Date of Patent: Feb. 14, 2006

(54) RELAY APPARATUS IN A DIGITAL RADIO COMMUNICATION SYSTEM AND A RELAY METHOD THEREOF

(75) Inventor: Masamitsu Miyazaki, Tachikawa (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 396 days.

(21) Appl. No.: 10/271,800

(22) Filed: Oct. 17, 2002

(65) Prior Publication Data

US 2003/0073403 A1 Apr. 17, 2003

(30) Foreign Application Priority Data

Oct. 17, 2001 (JP) ............................ 2001-319250

(51) Int. Cl.
*H04B 3/36* (2006.01)

(52) U.S. Cl. ....................................... 455/7; 455/422.1

(58) Field of Classification Search ............. 455/404.2, 455/422.1, 435.1, 443, 444, 449, 11.1, 242.1, 455/242.2, 7

See application file for complete search history.

(56) References Cited

U.S. PATENT DOCUMENTS 6,404,775 B1 * 6/2002 Leslie et al. ................ 370/466
2002/0077151 A1 * 6/2002 Matthews et al. .......... 455/561

FOREIGN PATENT DOCUMENTS

JP 63074234 4/1988
JP 10107727 4/1998

* cited by examiner

*Primary Examiner*—Tilahun Gesesse
*Assistant Examiner*—Tu X. Nguyen
(74) *Attorney, Agent, or Firm*—Mattingly, Stanger, Malur & Brundidge, P.C.

(57) ABSTRACT

A digital radio relay system has a control station having a line control unit, the control station having at least a first mobile station located in its communication zone, and a relay station coupled to the control station by a radio channel, the relay station having at least a second mobile station located in its communication zone, so that the control station and the relay station can be communicated by the radio channel, wherein when the first and second mobile stations communicate with each other, the line control unit has a timing control unit for adjusting timing of a communication between the first and second mobile stations, and the timing control unit adjusts a difference between a line connection time of the control station and the mobile station in the control station zone and a line connection time of the control station and the mobile station in the relay station zone.

12 Claims, 8 Drawing Sheets

RELAY APPARATUS IN A DIGITAL RADIO COMMUNICATION SYSTEM AND A RELAY METHOD THEREOF

BACKGROUND OF THE INVENTION

The present invention relates to a digital radio communication system. More specifically, the present invention relates to a relay apparatus in a digital radio communication system and a relay method thereof.

As shown in FIG. 6, a currently practically-used digital radio communication system is a system configured to provide a communication connection service between a control station 51 and a plurality of mobile stations M1, M2, . . . in a communication area 52 (also called a communication zone) of the control station 51 or a communication connection service between a plurality of mobile stations m1, m2, . . . in a communication area 54 of a relay station 53 and the control station 51 or the plurality of mobile stations M1, M2, . . . . A base station 55 may be located near the control station 51 or may be located in a place away therefrom. In this case, the control station 51 and the base station 55 are typically connected by a cable or a microwave line. FIG. 6 shows the case that the control station 51 and the base station 55 are located in the same place. The control station 51 connects a communication between the base station, the relay station and the plurality of mobile stations in the digital radio communication system and maintains and manages a service area. Line control equipment is provided in the control station 51 to control a call from the mobile station or a communication route setting. In FIG. 6, the relay station 53 is located in the communication area 52 of the control station 51, but is not necessarily located in the communication area 52. The control station and the relay station are connected by microwave multiplex radio transmission or a digital dedicated line.

FIG. 7 shows radio carrier frequency allocation which is allowed to be used in a narrow band digital system including a regional mobile telecommunication system using a digital radio technique in Japan. In FIG. 7, in the upward direction, that is, in the direction of mobile station→relay station→control station, based on 262 MHz, a 4 MHz band is allowed to have 160 waves (f1, f2, . . . ) with a 25 KHz width. In the downward direction, that is, in the direction of control station→relay station→mobile station, based on 271 MHz away from 262 MHz in the upward direction by 9 MHz, a 4 MHz band is allowed to have 160 waves (F1, F2, . . . ) with a 25 KHz width. In a communication of the digital radio communication system, the frequencies of f1, f2, . . . in the upward direction and F1, F2, . . . in the downward direction are used. Each system can use one or a plurality of radio carriers as a control carrier and the remainder as a communication carrier corresponding to its size. Needless to say, such frequency allocation is different by region and country. The standard of the digital radio system in Japan is defined by ARIB (Association of Radio Industries and Businesses) Standard-T79 (issued by Association of Radio Industries and Businesses in September, 2001) (hereinafter referred to as ARIB STD).

When such digital radio communication system performs a radio communication between the mobile stations in different zones such as a control station zone and a relay station zone, as in an analog radio communication system, the mobile station in the relay station zone, e.g., the mobile station m1 performs a radio communication with the mobile station in the zone of the control station 51, e.g., the mobile station M1 via the relay station 53. A radio communication channel controlled by the line control equipment of the control station is used in this radio communication.

FIG. 4 shows a specific configuration of an example of a digital radio communication system using a prior art radio relay system. FIG. 4 is a diagram of assistance in explaining an operation when the mobile station M1 calls the mobile station m1 in FIG. 6. The operation will be described in the downward direction, that is, in the direction of control station→relay station→mobile station. When there is a calling (connecting requirement) from the mobile station M1, the control station 51 (or via the base station 55) must detect the calling and establish a communication route from the control station 51 via the relay station 53 to the mobile station m1. When the control station detects the calling from the mobile station M1, the control station connects line control equipment 401 and a line I/F (interface) 404 of a relay station 400 via a transmission path 415 such as a digital dedicated line or microwave multiplex radio transmission.

A signal TS propagated via the line 415 is a digital signal of a frame structure and is indicated by a transmission signal TS of FIG. 8. In FIG. 8, one frame has a length of 40 msec so that the transmission signal is composed by repeating the frame. One frame also has 8 channels (CH1, CH2, . . . CH8) and one channel length is 5 msec. The CH1 is used as a control channel, for example and the CH2 to CH8 are used as a traffic channel, for example.

A signal received by the line I/F 404 using the control channel is applied to a data substituting unit 406 (hereinafter called a data converter 406). The data converter 406 performs a radio connection with the mobile station located in the relay station zone so as to convert a transmission format. That is, the signal is operated in synchronization with the line control equipment 401 at timing obtained from a timing generator 405 and is then converted to a control channel signal of a radio section based on control of a control unit 407. As shown in FIG. 8, the TS transmission signal having 8 channels in one frame is converted to two transmission signals C1 and C2, each of which has 4 channels in one frame. One frame of the transmission signals C1 and C2 has the same length of 40 msec as that of one frame of the transmission signal TS. The channel length of the transmission signals C1 and C2 is 10 msec.

The control channel format-converted by the data converter 406 is added a preamble, a synchronous word, a control signal and an error correction code conforming to the standard by a coder/decoder circuit 414 (hereinafter called a channel codec) for coding. A signal of the coded control channel is applied to a transmission modulation unit 411-1 and is then converted to a signal permitting a digital radio communication with the mobile station. The control channel which is a radio channel having a slot for common use is defined as a control channel in the ARIB STD.

A signal received by the line I/F 404 using the traffic channel is applied to the data converter 406, as in the control channel. A signal of the traffic channel applied to the data converter 406 is operated in synchronization with the line control equipment 401 at timing obtained from the timing generator 405, extracting only voice data from the transmission signal TS, as shown in FIG. 8, based on control of the control unit 407. The CH2 to CH4 are converted to the transmission signal C1 and the CH5 to CH8 are converted to the transmission signal C2 so as to be supplied to the channel codec 414. The channel codec 414 adds a preamble, a synchronous word, and an error correction code to the traffic channels of the transmission signals C1 and C2 for coding, which are then baseband signals of the radio section. The transmission signals C1 and C2 are applied to the transmission modulation units 411-1 and 411-2, respectively. The transmission signals C1 and C2 applied to the transmission modulation units 411-1 and 411-2 are converted to signals permitting a digital radio communication with the mobile station and are then amplified by power amplifier units 410-1 and 410-2 to be supplied to an antenna 408 via a transmission filter 409. The transmission signals C1 and C2 are outputted from the antenna 408 at the frequencies F1 and F2 as a communication wave in the downward direction, as described above. The antenna 408 of the relay station and an antenna 402 of the mobile station are connected by a digital radio channel. A transmit-receive unit 403 of the mobile station can receive the control channel signal and the traffic channel signal from the relay station. The traffic channel which is a radio channel having an individual allocation slot is defined as a traffic channel in the ARIB STD.

There are various digital modulation operations for use in the transmission modulation units 411-1 and 411-2. A predetermined modulation operation suitable for the digital radio communication system is used. A π/4 shift QPSK modulation operation is often used.

The operation in the upward direction, that is, mobile station→relay station→control station will be described. The signals at the frequencies of f1 and f2 transmitted from the transmit-receive unit 403 via the antenna 402 are received as reception information by the antenna 408 of the relay station and are then subjected to separation of frequency by a reception filter 413 for band limit to be outputted to reception demodulation units 415-1 and 415-2. The reception demodulation units 415-1 and 415-2 demodulate the reception information by a predetermined demodulation operation for output to the channel codec 414. The channel codec 414 performs decoding including error correction conforming to the standard. A signal process reversed from that in the downward direction is performed to provide the transmission signals C1 and C2 of FIG. 8, thereby obtaining the control channel signal and the traffic channel signal. The control channel signal and the traffic channel signal are applied to the data converter 406 and are then subjected to channel conversion reversed from that in the downward direction, thereby obtaining the transmission signal TS of FIG. 8. The control unit 407 selects necessary data and then transmits the selected signal from the line I/F 404 via the transmission path 415 to the line control equipment 401 to establish the communication route.

The above-described prior art digital radio relay system has the following problems.

(1) When the line control equipment of the control station and the relay station are connected by a digital dedicated line, a digital line of other companies is borrowed. Its use fee is required. The cost is high for a privately-owned radio communication system.

(2) When the line control equipment of the control station and the relay station are connected by a digital dedicated line, the digital dedicated line may be disconnected due to an external factor such as a disaster. The system cannot be used in the digital radio communication system for disaster prevention, which is a serious disadvantage in reliability.

(3) When the line control equipment of the control station and the relay station are connected by microwave multiplex radio transmission, the cost of the microwave multiplex radio transmission equipment is high and the cost of the microwave multiplex radio transmission equipment in the cost of the privately-owned radio communication system equipment is high. When handling the microwave multiplex radio transmission equipment, a high-degree operator qualification is required. It is hard for an independent user to introduce it.

The above-described problems (1) to (3) can be improved by connecting the control station and the relay station with the radio channel. When the control station and the relay station are connected by the radio channel, it takes time to process a signal for connection with the relay station by the radio channel, as described later. There arises a new problem that there is a difference in line connection facilitation between the mobile station in the communication zone of the control station and the mobile station in the relay station zone.

SUMMARY OF THE INVENTION

An object of the present invention is to provide a digital radio relay system having high reliability at a disaster.

Another object of the present invention is to provide a digital radio relay system which can easily perform a line connection.

A further object of the present invention is to provide a digital radio relay system which can reduce the cost to maintain a digital radio communication system.

To achieve the foregoing objects, a relay apparatus in a digital radio communication system of the present invention has:

a control station having a line control unit, the control station having at least a first mobile station located in its communication zone; and a relay station connected to the control station by a radio channel, the relay station having at least a second mobile station located in its communication zone, wherein when the first and second mobile stations communicate with each other, the line control unit has a timing control unit adjusting timing of the communication between the first and second mobile stations.

The line control unit for use in a relay apparatus in a digital radio communication system of the present invention has a storage unit storing communication area locations where the first and second mobile stations are located.

The timing control unit of the line control unit for use in a relay apparatus in a digital radio communication system of the present invention has a function delaying communication timing of a first mobile station based on the location information of the first mobile station from the storage unit.

A relay apparatus in a digital radio communication system of the present invention further has a base station, the base station being located in the control station so that the communication zone of the base station and the communication zone of the control station are common.

A relay apparatus in a digital radio communication system of the present invention further has a base station, the first mobile station being located in the communication area of the base station, and the line control unit controlling a communication between the base station and the relay station.

In a relay apparatus in a digital radio communication system of the present invention, a predetermined frequency band to be allocated to a communication between the control station and the first mobile station is equal to a predetermined frequency band to be allocated to a communication between the control station and the relay station.

In a relay apparatus in a digital radio communication system of the present invention, the control station has the line control unit, a data converter coupled to the line control unit converting data of a transmission signal, a first channel codec coupled to the data converter coding/decoding the transmission signal in a predetermined format, and a first radio transmit-receive unit of the transmission signal coupled to the first channel codec permitting a radio communication with the first mobile station, and the relay station has a second radio transmit-receive unit transmitting and receiving a transmission signal between the control unit and the relay station, a second channel codec coupled to the second radio transmit-receive unit coding/decoding the transmission signal in a predetermined format, a channel converter coupled to the second channel codec channel-converting the transmission signal, a third channel codec coupled to the channel converter coding/decoding the transmission signal in a predetermined format, and a third transmit-receive unit of the transmission signal coupled to the third channel codec permitting a radio communication with the second mobile station.

In a relay apparatus in a digital radio communication system of the present invention, the line control unit has a storage unit storing the location information of the mobile station in the communication area of the control unit and the location information of the mobile station in the communication area of the relay station, and the timing control unit adjusts timing of a communication between the first and second mobile stations based on the location information of the storage unit.

A control station for use in a digital communication system including the control station, at least one relay station and at least one mobile station, the control station having a line control unit, a data converter coupled to the line control unit converting data of a transmission signal, a first channel codec coupled to the data converter coding/decoding the transmission signal in a predetermined format, and a radio transmit-receive unit of the transmission signal coupled to the first channel codec permitting a radio communication with the mobile station.

The line control unit for use in a control station of the present invention has a storage unit storing the location information of the mobile station in the communication area and a timing control unit adjusting timing of a communication between the mobile stations based on the location information of the storage unit.

A relay method in a digital radio communication system of the present invention which has:

a control station having a line control unit, the control station having at least a first mobile station located in its communication zone, and a relay station connected to the control station by a radio channel, the relay station having at least a second mobile station located in its communication zone, the relay method including the steps of, when the first and second mobile stations communicate with each other, detecting the locations of the first and second mobile stations, and adjusting timing of a communication between the first and second mobile stations based on the detection information of the locations of the first and second mobile stations.

In a relay method in a digital radio communication system of the present invention, in which the line control equipment has a storage unit storing the communication area locations where the first and second mobile stations are located and a timing control unit adjusts timing of a communication between the first and second mobile stations, the timing adjusting step of the relay method is a step of delaying the communication timing of the first mobile station based on the location information of the first mobile station from the storage unit.

According to the present invention, a relay method in a digital radio communication system including a control station having a line control unit, at least one relay station and at least one mobile station, which is able to move between communication zones of the control station and the relay station, the relay method comprising the steps of, determining whether the mobile station is in the zone of the control station when a communication is to be connected by the mobile station, and adding a delay in the timing of transmission of the communication if the mobile station is in the zone of the control station.

In a relay method of the present invention, the, delay is equal to a difference between a line connection time of the control station with a first mobile station in the communication zone of the control station and a line connection time of the control station with a second mobile station located in the communication zone of the relay station via the relay station.

The above and other objects, features and advantages of the present invention will be apparent from the following detailed description of illustrative embodiments which is to be read in connection with the accompanying drawings.

DETAILED DESCRIPTION OF THE ILLUSTRATED EMBODIMENTS

Figure 6:
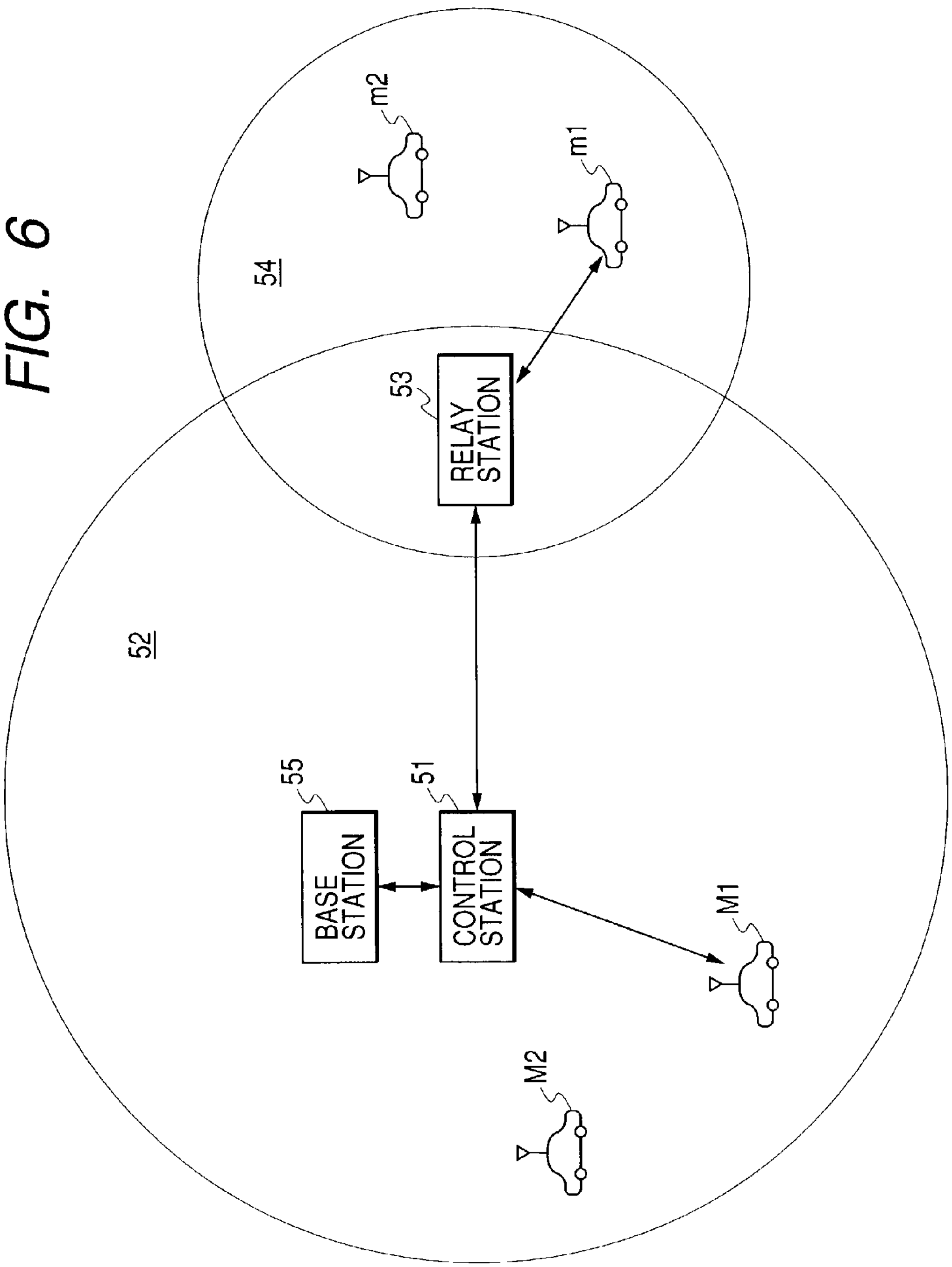
FIG. 6 is a diagram showing the schematic configuration of a digital radio relay system of assistance in explaining the present invention.
Figure 7:
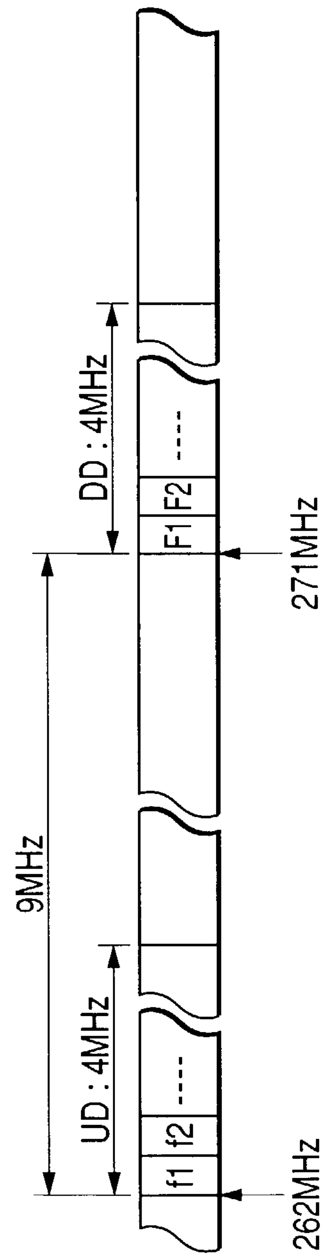
FIG. 7 is a diagram showing the configuration of radio carrier frequencies for use in a digital radio communication system.

As explained in FIG. 6, in a digital radio communication system, there are the case of a communication between the mobile stations in the service area 52 of the control station 51 (or the communication area of the base station 55), e.g., the mobile stations M1 and M2 and the case of a communication between the mobile station m1 outside the service area 52 of the control station 51 and in the service area 54 of the relay station 53 provided on a high place such as the top of a mountain and the mobile station M1 in the service area 52 of the control station 51. In the latter case, the transmit-receive unit of the control station 51 and the transmit-receive unit of the relay station 53 must be connected. In such case, the number of cannels of the relay station is typically more than one. As described above, they are typically connected by a digital dedicated line or microwave multiplex radio transmission. Use of the digital dedicated line or the microwave multiplex radio transmission has clearly the above problems. To solve the problems, the present invention employs a system for connecting the transmit-receive unit of the control station and the transmit-receive unit of the relay station by a radio channel. That is, the transmit-receive unit is provided in the control station so as to secure a sufficient service in the mobile station in the communication area of the control station and provide a sufficient service to the mobile station outside the communication area of the control station via the relay station connected by the radio channel. In the radio communication system for disaster prevention, such connection method by the radio channel is required strongly from users. Such connection by the radio channel imposes a new problem. The present invention is a digital radio relay system which can solve it together.

Figure 1:
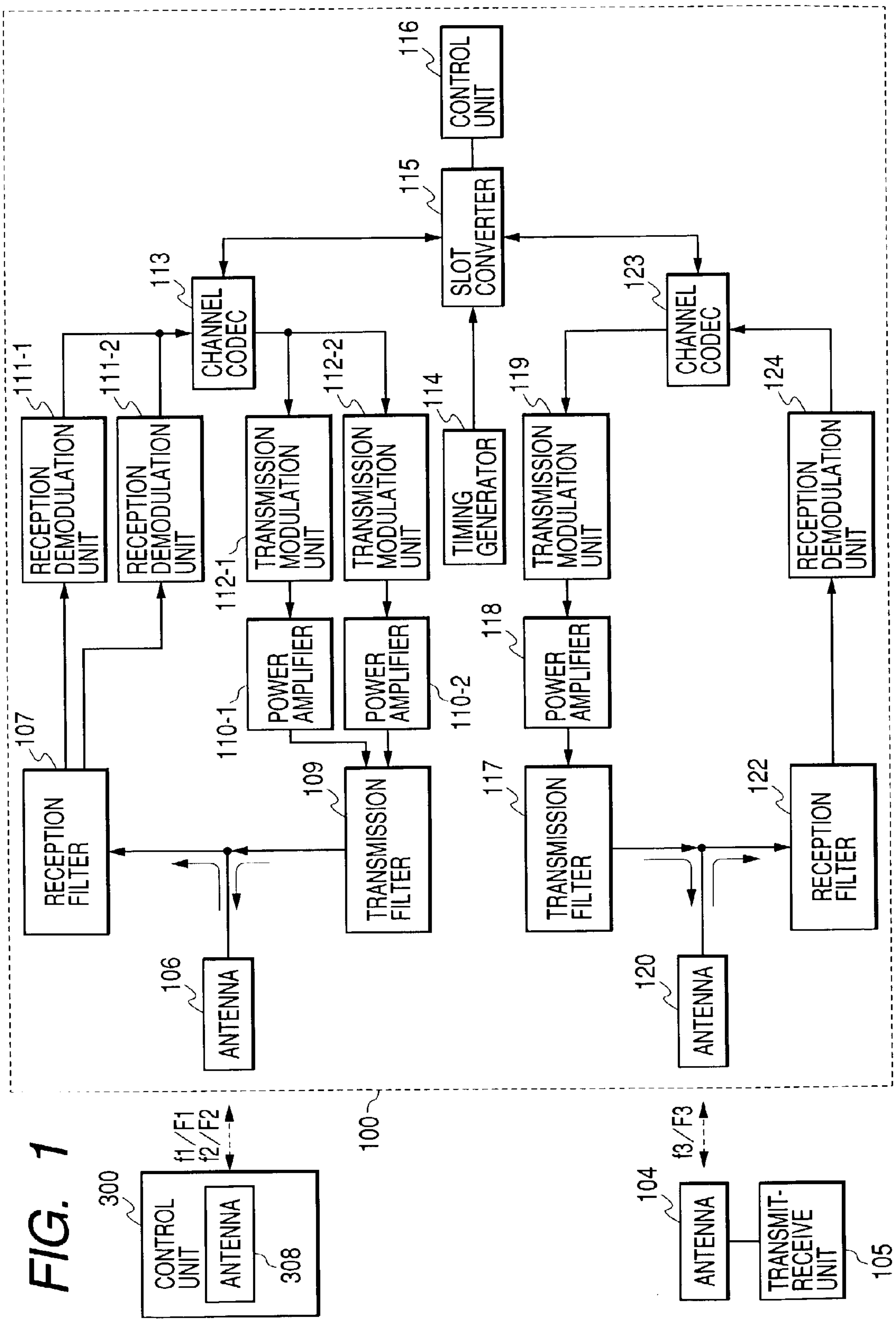
FIG. 1 is a block diagram showing the configuration of a control station and a relay station of an embodiment of the present invention.
Figure 2:
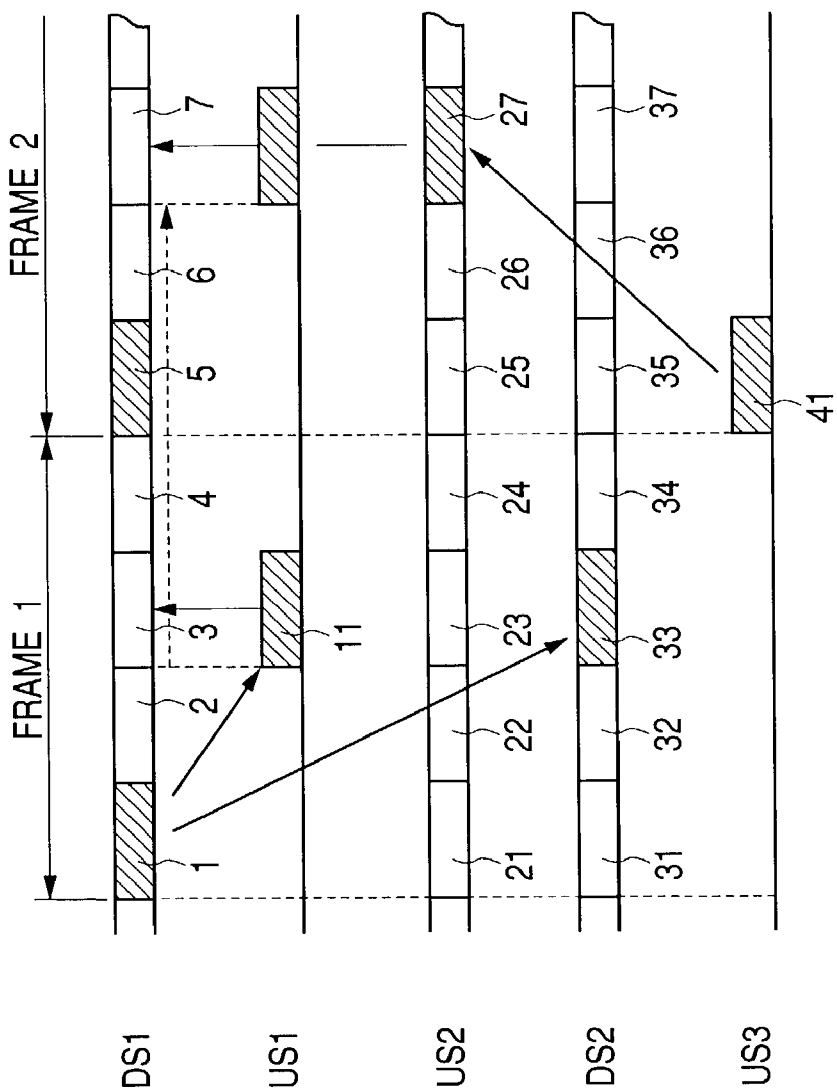
FIG. 2 is a diagram showing a time chart of assistance in explaining the operation of the present invention.
Figure 3:
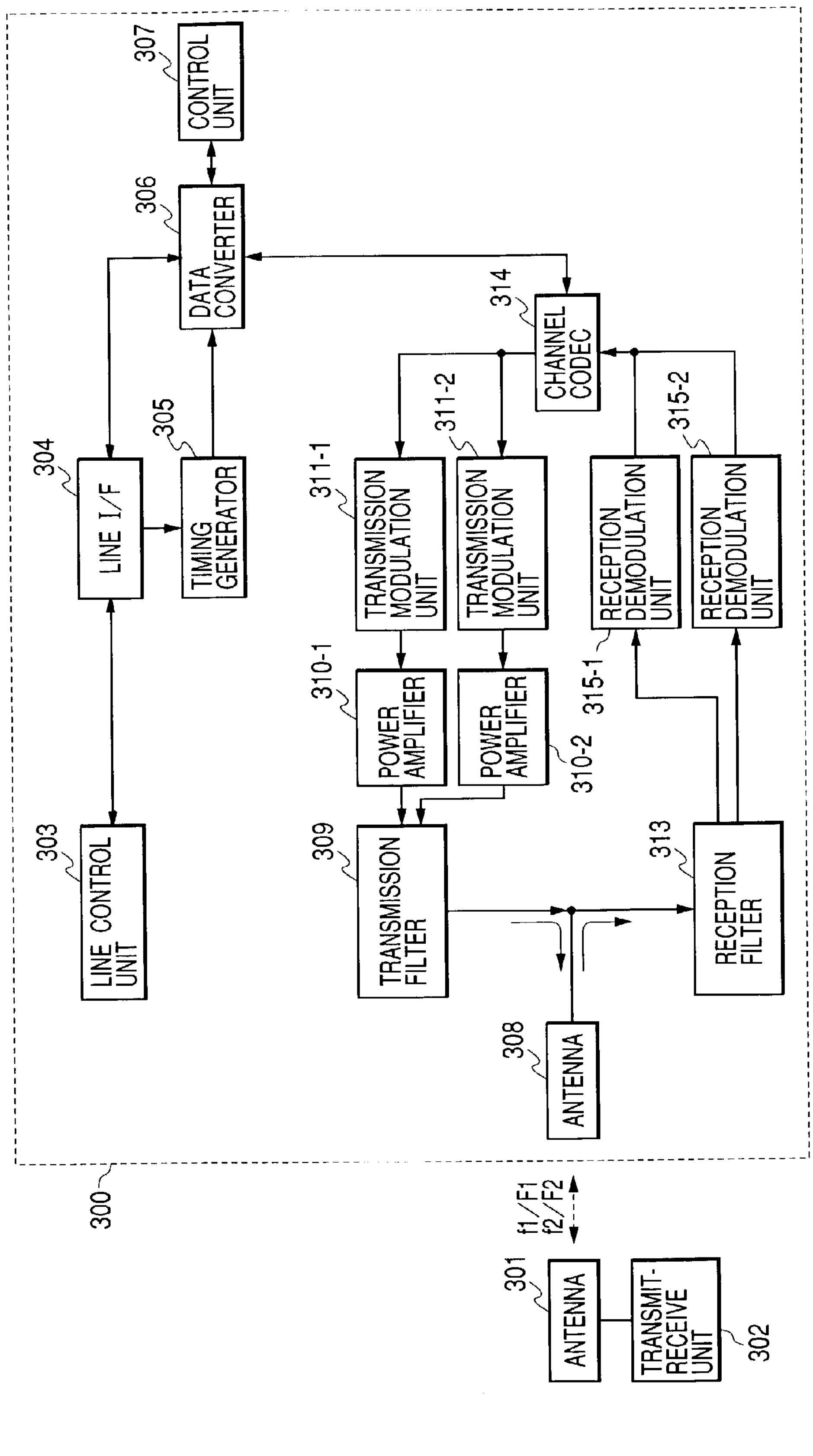
FIG. 3 is a block diagram showing the configuration of the control station of an embodiment of the present invention.
Figure 4:
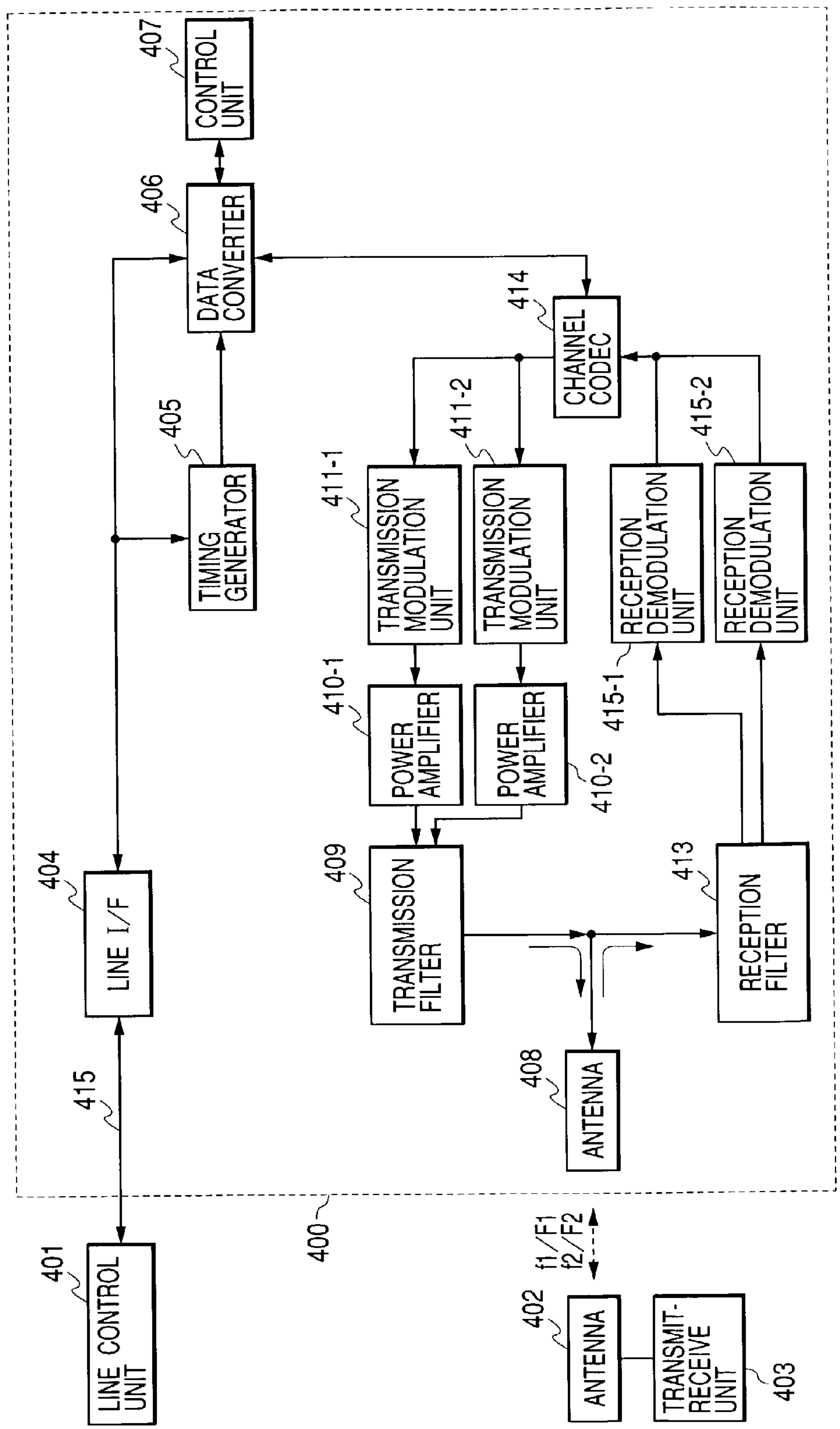
FIG. 4 is a block diagram showing an example of a prior art digital radio relay system.
Figure 5:
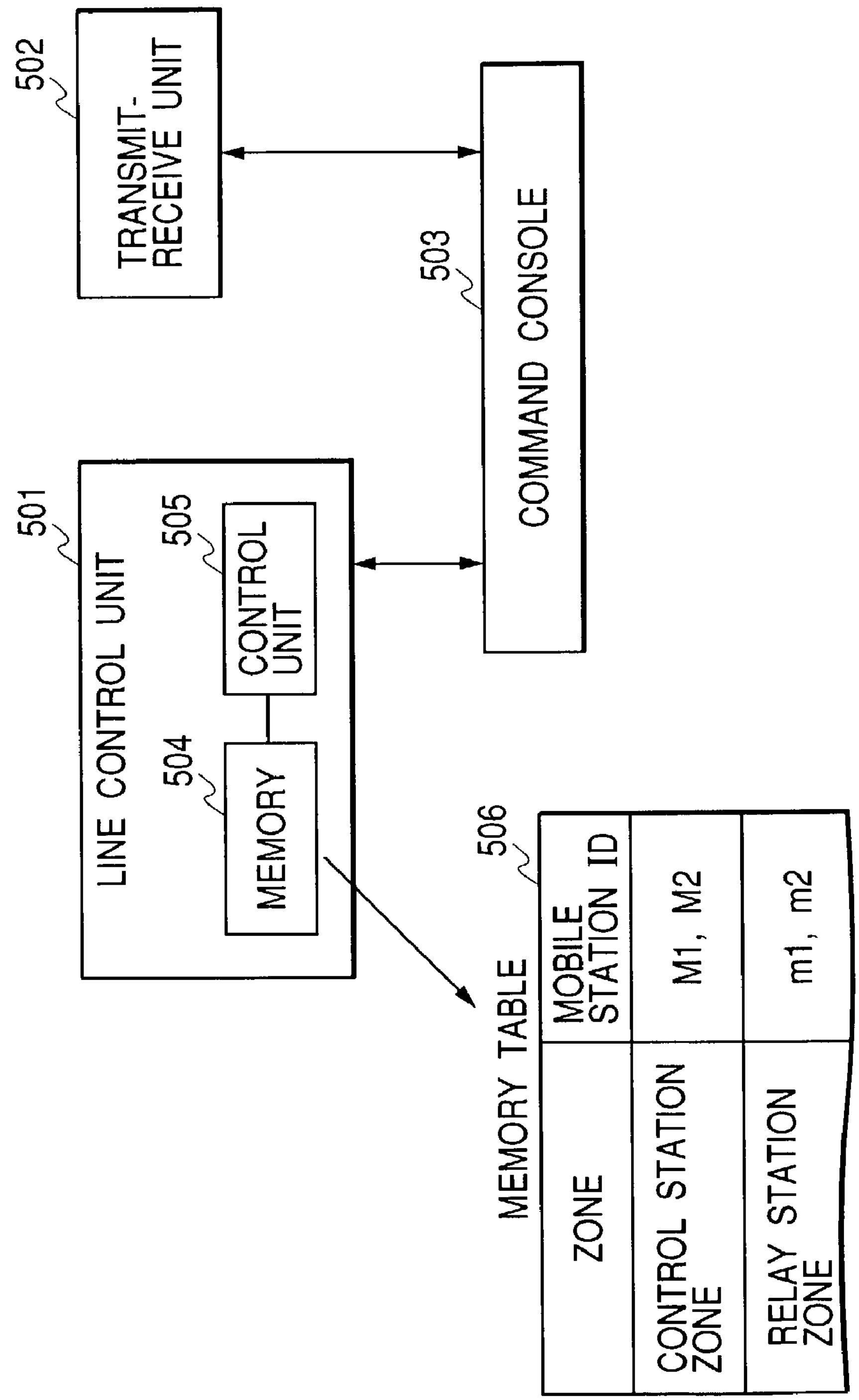
FIG. 5 is a block diagram showing the configuration of the control station of the present invention.
Figure 8:
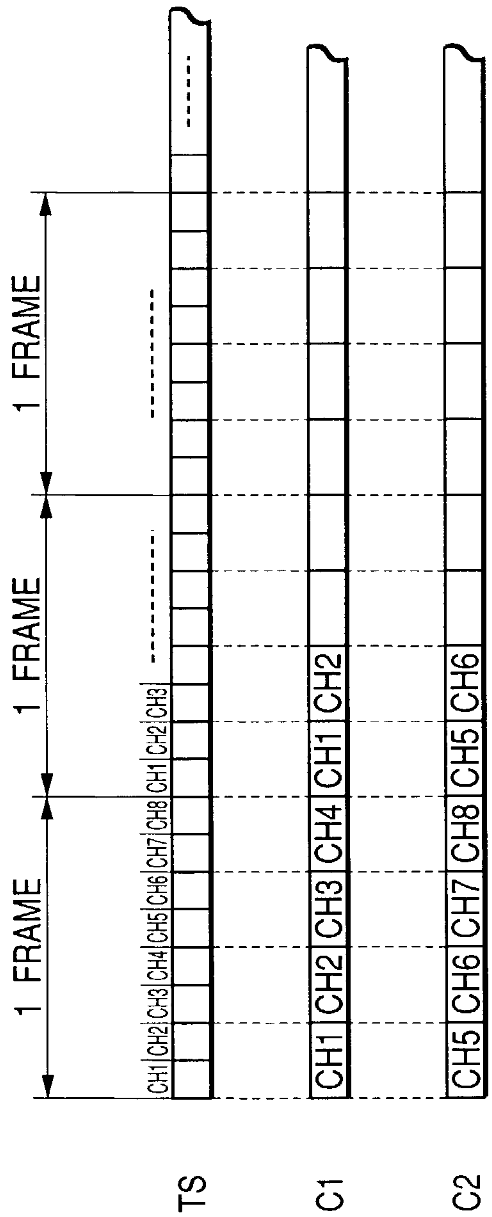
FIG. 8 is a diagram of assistance in explaining an embodiment of data conversion of the present invention.
Figure 9:
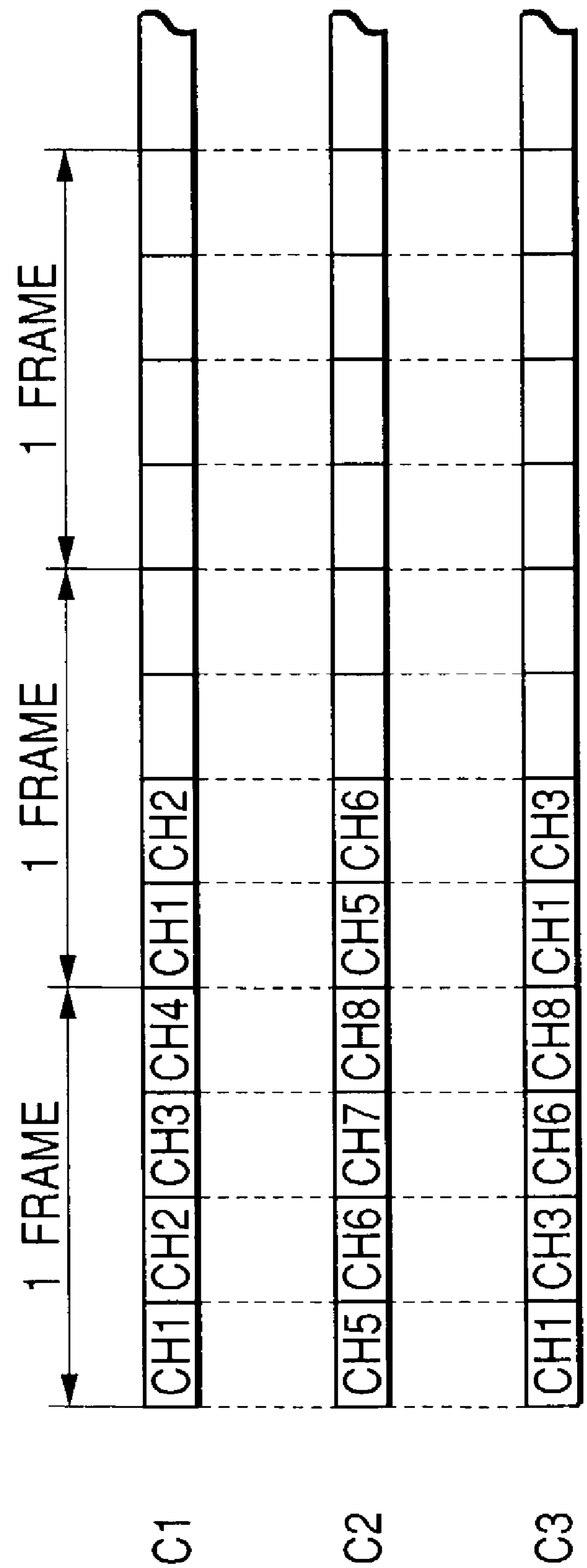
FIG. 9 is a diagram of assistance in explaining an embodiment of slot conversion of the present invention.

An embodiment of the present invention will be described using FIGS. 1, 2, 3, 4, 8 and 9. FIG. 1 is a block diagram showing an embodiment of the present invention. FIG. 2 is a diagram showing a time chart of assistance in explaining the operation of the present invention. FIG. 3 is a block diagram showing the configuration of a control station and a mobile station in the zone of the control station according to the present invention and corresponds to a communication between the control station 51 and the mobile station M1 of FIG. 6. FIG. 5 is a block diagram showing the configuration of the control station for use in the present invention. FIGS. 8 and 9 are diagrams showing transmission signals of a frame structure of assistance in explaining the operation of the present invention.

The configuration of the control station of FIG. 5 will be described. In FIG. 5, the numeral 501 denotes a line control unit which performs line connection control of the base station, the relay station and the mobile station such as calling control and communication route establishment control. The line control unit 501 has a memory 504 which always monitors in which communication area the mobile station is located and stores the locations of the mobile stations into the memory 504. In the monitoring method, each of the mobile stations is given a different ID No. to judge whether the mobile station is located in the control station zone or in the relay station zone from the ID No. and the location information of the mobile station for storage into a memory table 506 of the memory 504. Needless to say, the location information is updated suitably. A transmit-receive unit 502 is used for transmission and reception between the mobile station in the control station and the relay station. A control unit 505 performs control of calling from the mobile station and communication route setting. A command console 503 is a console of the digital radio system of the present invention and has a function selecting voice or non-voice and performing operational control of the system.

The operation between the control station and the mobile station in the control station zone will be described with FIG. 3. The numeral 300 denotes a control station; the numeral 302, a transmit-receive unit of the mobile station located in the control station zone; the numeral 303, a line control unit; and the numeral 304, a line I/F (interface) of the control station. The line control unit 303 and the line I/F 304 are directly connected by a cable. A communication is performed using the control channel and a plurality of traffic channels. The transmit-receive operation between the control station 300 and the transmit-receive unit 302 of the mobile station is the same as that between the relay station 400 and the transmit-receive unit 403 of the mobile station shown in FIG. 4. It will be described briefly herein.

In FIG. 3, the operation in the downward direction (line control unit→control station→mobile station in the control station zone) will be described. A transmission signal TS (equal to the TS of FIG. 8) including the control channel and the traffic channel sent from the line control unit 303 is applied to a data converter 306 via the line I/F 304. A signal received using the control channel of the transmission signal TS is applied to the data substituting unit 306 (hereinafter called the data converter 306). To perform a radio connection with the mobile station located in the control station zone, the data converter 306 converts a transmission format, as described above. The signal is operated in synchronization with the line control unit 303 at timing obtained from a timing generator 305 and is then converted to a control channel signal of the radio section based on control of a control unit 307. As shown in FIG. 8, it is converted to the two transmission signals C1 and C2. The two transmission signals C1 and C2 employ a quadruple TDMA (time division multiple access) method which configure one frame by four slots. The detail is defined in the ARIB STD.

The control channel format-converted by the data converter 306 is added a preamble, a synchronous word, a control signal and an error correction code conforming to the standard by a coder/decoder circuit 314 (hereinafter called a channel codec) for coding. The signal of the coded control channel signal is applied to a transmission modulation unit 311-1 and is then converted to a signal permitting a digital radio communication with the mobile station.

A signal received by the line I/F 304 using the traffic channel is applied to the data converter 306. The signal of the traffic channel applied to the data converter 306 extracts only voice data from the transmission signal TS, as shown in FIG. 8, based on control of the control unit 307. The CH2 to CH4 are converted to the transmission signal C1 and the CH5 to CH8 are converted to the transmission signal C2, for example, so as to be supplied to the channel codec 314. The channel codec 314 adds a preamble, a synchronous word, and an error correction code to the traffic channels of the transmission signals C1 and C2 for coding, which are then applied to the transmission modulation units 311-1 and 311-2, respectively. The transmission signals C1 and C2 applied to the transmission modulation units 311-1 and 311-2 are converted to signals permitting a digital radio communication with the mobile station and are then amplified by power amplifier units 310-1 and 310-2 to be supplied to an antenna 308 via a transmission filter 309. The transmission signals C1 and C2 are outputted from the antenna 308 at the frequencies F1 and F2 as a communication wave in the downward direction, as described above. The antenna 308 of the control station and an antenna 301 of the mobile station are connected by a digital radio channel. The transmit-receive unit 302 of the mobile station can receive the control channel signal and the traffic channel signal from the control station.

There are various digital modulation operations for use in the transmission modulation units 311-1 and 311-2. A predetermined modulation operation suitable for the digital radio communication system is used. A $\pi/4$ shift QPSK modulation operation is often used.

The operation in the upward direction, that is, mobile station→control station→line control unit will be described. The signals at the frequencies of f1 and f2 transmitted from the transmit-receive unit 302 via the antenna 301 are received as reception information by the antenna 308 of the control station and are then subjected to separation of frequency by the reception filter 313 for band limit to be outputted to reception demodulation units 315-1 and 315-2. The reception demodulation units 315-1 and 315-2 demodulate the reception information by a predetermined demodulation operation for output to the channel codec 314. The channel codec 314 performs decoding including error correction conforming to the standard. A signal process reversed from that of the downward direction is performed to provide the communication signals C1 and C2 of FIG. 8, obtaining the control channel signal and the traffic channel signal. The control channel signal and the traffic channel signal are applied to the data converter 306 and are subjected to channel conversion reversed from that in the downward direction, obtaining the transmission signal TS of FIG. 8. The control unit 407 selects necessary data from the transmission signal and transmits it via the line I/F 304 to the line control unit 303 to establish the communication route.

The operation of the control station 300 and the mobile station in the communication area of the control station 300 is described above. The timing in the case that the control station 300 calls the mobile station in the communication area of the control station 300 will be described based on FIG. 2. FIG. 2 schematically represents the timing of calling between the control station, the relay station and the mobile station and indicates the same transmission signal as the transmission signals C1 and C2 shown in FIG. 8. That is, a first frame, a second frame, . . . are repeated. Each of the frames has four channels, as described above. Here, the channel is called a slot.

In FIG. 2, when the control station 300 calls the mobile station in the communication area of the control station using a first slot 1 of a transmission signal DS1 in the downward direction, the transmit-receive unit 302 of the mobile station responds to the control station 300 at timing of a third slot 11 of a transmission signal US1 in the upward direction. As is apparent from the operational explanation of the control station 300 of FIG. 3, a signal process such as data conversion is performed for response delayed by two slots. The mobile stations located in the communication area in the control station 300 have the same conditions. The calling timing between the mobile stations located in the communication area in the control station 300 is not different in each of the mobile statios. No trouble occurs in a line communication.

The line connection of the mobile station located in the communication area of the relay station via the relay station will be described using FIG. 1. In FIG. 1, the control station 300 (the detail is shown in FIG. 3) communicates with a relay station 100 via the radio channel and the relay station 100 communicates with a transmit-receive unit 105 of the mobile station in the communication area of the relay station 100. In FIG. 1, the operation in the downward direction (control station→relay station→mobile station in the relay station zone) will be described. Signals transmitted from the antenna 308 of the control station 300 are outputted from the antenna 308 at the frequencies F1 and F2 as a communication wave in the downward direction, as in the communication of the control station 300 and the mobile station in the communication area of the control station 300 explained in FIG. 3 and are then received by an antenna 106.

The transmission signals at the frequencies F1 and F2 are separated by a reception filter 107 for band limit and are then outputted to reception demodulation units 111-1 and 111-2. The reception demodulation units 111-1 and 111-2 demodulate the reception information by a predetermined demodulation operation and output it to a coder/decoder 113 (hereinafter called a channel codec 113). The channel codec 113 performs error correction conforming to the standard and decodes the reception information, obtaining the control channel signal and the traffic channel signal (the signals indicated by the signals C1 and C2 of FIG. 8). The control channel signal and the traffic cannel signal are applied to a slot substituting unit 115 (hereinafter called a slot converter 115).

The slot converter 115 converts the control channel signal and the traffic channel signal applied to the slot converter 115 to the control channel signal and the traffic channel signal of the radio section of the relay station 100 based on the synchronous timing of a timing generator 114 and control of a control unit 116. As shown in FIG. 9, the two-system transmission signals C1 and C2 are converted to one-system transmission signal C3. As is apparent from FIG. 9, a two-system 8-channels signal is suitably selected to be converted to a one-system 4-channels signal. When the channel CH1 in the transmission signal C1 is a control signal and the channels CH3, CH6 and CH8 are traffic channel signals, for example, the transmission signal C3 has the channels CH1, CH3, CH6 and CH8. The reason why the number of channels may be small, is as follows. The control station must respond to calling from many mobile stations or relay stations and needs 8 channels. The relay station targets only the mobile station in the communication area of the relay station. Therefore, four channels are thus sufficient.

The transmission signal C3 generated by the slot converter 115 is applied to a coder/decoder 123 (hereinafter called a channel codec 123). The channel codec 123 adds a preamble, a synchronous word, a control signal and an error correction code conforming to the standard to the control channel signal and the traffic channel signal for coding, as in the above-described case. The coded transmission information is digital-modulated by a transmission modulation unit 119 to be outputted as the transmission signal at the frequency F3 from an antenna 120 via a power amplifier unit 118 and a transmission filter 117. There are various digital modulation operations for use in the transmission modulation unit 119. A predetermined modulation operation suitable for the digital radio communication system is used. A $\pi/4$ shift QPSK modulation operation is often used.

The antenna 120 of the relay station 100 and the antenna 104 of the mobile station in the zone of the relay station 100 are connected by a digital radio channel. The transmit-receive unit 105 of the mobile station in the zone of the relay station 100 can receive the control channel signal and the traffic channel signal from the control station.

The operation in the upward direction (mobile station in the relay station zone→relay station→control station) will be described. An information signal transmitted as the transmission signal at the frequency of f3 from the transmit-receive unit 105 of the mobile station in the zone of the relay station 100 via the antenna 104 is received by the antenna 120 of the relay station 100 for band limit in a reception filter 122 and is then inputted to a reception demodulation unit 124. The reception demodulation unit 124 demodulates the inputted signal by a predetermined demodulation method. The demodulated information signal is outputted to the channel codec 123. The channel codec 123 performs error correction conforming to the standard to the information signal for decoding to obtain the control channel signal and the traffic channel signal. The control channel signal and the traffic channel signal are applied to the slot converter 115. The slot converter 115 performs slot conversion reversed from that of the downward direction. As shown in FIG. 9, the transmission signal C3 is converted to the transmission signals C1 and C2 to be applied to the channel codec 113.

The channel codec 113 adds a preamble, a synchronous word, a control signal and an error correction code conforming to the standard to the control channel signal and the traffic channel signal for coding to be sent to transmission modulation units 112-1 and 112-2 as baseband signals in the upward radio section. The baseband signals are digital-modulated by the transmission modulation units 112-1 and 112-2 to be outputted to power amplifier units 110-1 and 110-2. There are various digital modulation operations for use in the transmission modulation unit. A predetermined modulation operation suitable for the digital radio communication system is used. A $\pi/4$ shift QPSK modulation operation is often used. The digital-modulated and amplified transmission signals are selected by a transmission filter 109 for band limit and become the transmission signals at frequencies f1 and f2 to be outputted from the antenna 106. The transmission signals at frequencies f1 and f2 are received by the antenna 308 of the control station 300 to establish the communication route.

The operation of the control station 300, the relay station 100 and the mobile station in the relay station area is described above. The timing in the case that the control station 300 calls the mobile station in the area of the relay station 100 will be described based on FIG. 2. FIG. 2 schematically represents the timing of calling between the control station, the relay station and the mobile station. In FIG. 2, the control station 300 calls the mobile station in the communication area of the relay station 100 using the first slot 1 of the transmission signal DS1 in the downward direction. When the control station 300 calls the relay station 100 using the first slot 1 of the transmission signal DS1 in the downward direction, the relay station 100 performs relay using a third slot 33 of a first frame of a transmission signal DS2 in the downward direction, resulting in a delay of 2 slots. The reason of the delay is caused by delay of the reception process in the relay station 100, as described above.

Next, the relay station 100 calls the transmit-receive unit 105 of the mobile station in the communication area of the relay station 100 using the slot 33 of the transmission signal DS2. The transmit-receive unit 105 of the mobile station in the communication area of the relay station 100 gives a response using a slot 41 of a transmission signal US3 in the upward direction, resulting in a delay of 2 slots from the slot 33. This is caused by delay of a reception process in the mobile station. The response of the transmit-receive unit 105 of the mobile station in the communication area of the relay station 100 is performed using the slot 41 of the transmission signal US3 in the upward direction. The relay station 100 responds to the control station 300 using a slot 27 of a transmission signal US2 in the upward direction, resulting in a delay of 2 slots from the slot 41. This delay is delay of the reception process in the relay station 100. Accordingly, the response time during which the control station 300 calls the mobile station in the communication area of the relay station 100 via the relay station 100 is delayed by 4 slots, that is, by one frame, as compared with the response time during which the mobile station in the communication area in the control station 300 is called.

As described above, when the control station 300 uses the first slot in the downward direction to call the mobile station in the communication zone of the control station 300 and the mobile station in the communication zone of the relay station 100, the reception timing of the response signal is in the third slot delayed by 2 slots in the mobile station in the communication zone of the control station 300 and the mobile station in the communication zone of the relay station 100 is in the seventh slot delayed by 4 slots, that is, one frame. The reception timing of the response signal when calling the mobile station in the relay station zone is delayed by one frame as compared with that when calling the mobile station in the control station zone. This delay of 40 msec is a serious problem in a line connection. It accompanies a feeling of incongruity for communication.

To solve the problem, in the present invention, as shown in FIG. 5, the line control unit 501 is provides the memory table 506 which stores in which communication zone each of the mobile stations is located. When there is a calling from the mobile station in the communication area of the relay station 100, e.g., the mobile station m1 to call the mobile station in the communication area of the control station 300, e.g., the mobile station M1, the control unit 505 of the line control equipment can be realized by delaying timing to call the mobile station M1 by one frame. A method for delaying by one frame can be easily realized by delaying by 4 slots at data conversion.

In a method for specifying the location of the mobile station, each mobile station is given an ID No., and the control station stores the ID No. of the mobile station in the control station zone and the ID No. of the mobile station in the relay station zone into the memory table 506 of the memory 504. Each time the mobile station moves, the contents of the memory table may be updated.

In the digital radio relay system of this embodiment, as described above, the radio frequency allocation can effectively use the frequencies. In the digital radio communication system shown in this embodiment, two sets of frequencies, for example, the frequencies in the upward direction are f1 and f2 and the frequencies in the downward direction are F1 and F2. For a communication between the transmit-receive unit of the control station and the mobile station in the control station zone and a communication between the transmit-receive unit of the control station and the transmit-receive unit of the relay station, f1/F1 and f2/F2 are allocated. For a communication between the transmit-receive unit of the relay station and the transmit-receive unit of the mobile station in the relay station zone, the frequency f3 in the upward direction is used and the frequency in the downward direction is F3. The transmit-receive unit of the control station, the transmit-receive unit of the relay station to the control station and the transmit-receive unit of the mobile station in the communication area of the control station are allocated the same frequency, effectively using the frequencies.

In the digital radio communication system shown in FIG. 1, (f1/F1, f2/F2) and f3/F3 are frequencies (frequencies within a predetermined band) allocated to the transmit-receive unit of the relay station. (f1/F1, f2/F2) and f3/F3 must be separated from each other as far as possible. The attenuation characteristic of the transmission filters 109 and 117 and the reception filters 107 and 122 must be secured sufficiently. To reduce the influence of the transmission frequencies (f1, f2) of the relay station 100 on the reception frequency f3, and to reduce the influence of the transmission frequency F3 of the relay station 100 on the reception frequencies (F1, F2), it is desirable that they be typically separated from each other by above 1 MHz. The distance between the antennas in the vertical or horizontal direction must be secured sufficiently to hold the coupling attenuation.

As described above, the present invention provides a digital radio relay system connecting a control station and a relay station by a radio channel using a plurality of frequencies within a predetermined band. The frequencies can be effectively used as compared with the prior art system for using a digital dedicated line or microwave multiplex radio transmission between a control station and a relay station. As compared with the system for connecting the control station and the relay station by the digital dedicated line, the possibility of line disconnection due to a disaster is low, realizing a digital radio relay system having a high reliability. As compared with the system for connection by digital dedicated line or the microwave multiplex radio transmission, the running cost of the system can be significantly reduced.

Further, the control station and the relay station are connected by the radio channel. Connection of the mobile station in the control station zone and the mobile station in the relay station zone can give a response at the same timing. Preferable connection control can be made.

It will be appreciated while particular embodiments of the invention have been shown and described, modifications may be made. It is intended in the claims to cover all modifications which come within the true spirit and scope of the invention.

What is claimed is:

1. A relay apparatus in a digital radio communication system comprising:

a control station having a line control unit including a storage unit;

at least a first mobile station located in a communication zone of said control station;

a relay station coupled to said control station by a radio channel; and at least a second mobile station located in a communication zone of said relay station, wherein information of the locations of said first and second mobile stations is stored in said storage unit, and when said first and second mobile stations communicate with each other, said line control unit has a timing control unit which adjusts timing of the communication between said first and second mobile stations based on said information of the locations of said first and second mobile stations stored in said storage unit.

2. A relay apparatus according to claim 1, further comprising:

a base station, said base station being located in said control station so that the communication area of said base station and the communication area of said control station are common.

3. A relay apparatus according to claim 1, further comprising:

a base station, said first mobile station being located in the communication area of said base station, and said line control unit controlling a communication between said base station and said relay station.

4. A relay apparatus according to claim 1, wherein a predetermined frequency band to be allocated to a communication between said control station and said first mobile station is equal to a predetermined frequency band to be allocated to a communication between said control station and said relay station.

5. A relay apparatus according to claim 1, wherein said control station comprises said line control unit, a data converter coupled to said line control unit for converting data of a transmission signal, a first channel codec coupled to said data converter, for coding/decoding said transmission signal in a predetermined format, and a first radio transmit-receive unit of said transmission signal coupled to said first channel codec, for permitting a radio communication with said first mobile station, and said relay station comprises a second radio transmit-receive unit for transmitting and receiving a transmission signal between said control unit and said relay station, a second channel codec coupled to said second radio transmit-receive unit, for coding/decoding said transmission signal in a predetermined format, a channel converter coupled to said second channel codec, for channel-converting said transmission signal, a third channel codec coupled to said channel converter for coding/decoding said transmission signal in a predetermined format, and a third transmit-receive unit of said transmission signal coupled to said third channel codec, for permitting a radio communication with said second mobile station.

6. A relay apparatus in a digital radio communication system comprising:

a control station having a line control unit;

at least a first mobile station located in a communication zone of said control station;

a relay station coupled to said control station by a radio channel; and at least a second mobile station located in a communication zone of said relay station, wherein said control station comprises said line control unit, a data converter coupled to said line control unit for converting data of a transmission signal, a first channel codec coupled to said data converter, for coding/decoding said transmission signal in a predetermined format, and a first radio transmit-receive unit of said transmission signal coupled to said first channel code, for permitting a radio communication with said first mobile station, wherein said relay station comprises a second radio transmit-receive unit for transmitting and receiving a transmission signal between said control unit and said relay station, a second channel codec coupled to said second radio transmit-receive unit, for coding/decoding said transmission signal in a predetermined format, a channel converter coupled to said second channel code, for channel-converting said transmission signal, a third channel codec coupled to said channel converter for coding/decoding said transmission signal in a predetermined format, and a third transmit-receive unit of said transmission signal coupled to said third channel codec, for permitting a radio communication with said second mobile station, and wherein said line control unit includes a storage unit for storing a location information of said mobile station in the communication area of said control unit and a location information of said mobile station in the communication area of said relay station, and a timing control unit which adjusts timing of a communication between said first and second mobile stations based on said location information of said storage unit when said first and second mobile stations communicate with each other.

7. A control station for use in a digital communication system including said control station, at least one relay station and at least one mobile station, comprising:

a line control unit;

a data converter coupled to said line control unit, for converting data of a transmission signal;

a first channel codec coupled to said data converter, for coding/decoding said transmission signal in a predetermined format; and a radio transmit-receive unit of said transmission signal coupled to said first channel codec, for permitting a radio communication with said mobile station, wherein said line control unit comprises a storage unit for storing the location information of said mobile station which is located in either one of a communication zone of said control station and a communication zone of said relay station and a timing control unit for adjusting timing of the communication of said mobile station based on the location information of said storage unit when said first and second mobile stations communicate with each other.

8. A control station for use in a digital communication system including said control station, at least one relay station and at least two mobile stations, comprising:

a line control unit;

a data converter coupled to said line control unit, for converting data of a transmission signal;

a first channel codec coupled to said data converter, for coding/decoding said transmission signal in a predetermined format; and a radio transmit-receive unit of said transmission signal coupled to said first channel codec, for permitting a radio communication with said mobile station, wherein said line control unit comprises a storage unit for storing the location information of said mobile stations in a communication area and a timing control unit for adjusting timing of a communication between said mobile stations based on the location information of said storage unit.

9. A relay method in a digital radio communication system comprising:

a control station having a line control unit;

at least a first mobile station located in a communication zone of said control station;

a relay station coupled to said control station by a radio channel; and at least a second mobile station located in a communication zone of said relay station;

said method comprising the steps of:

when said first and second mobile stations communicate with each other, detecting the locations of said first and second mobile stations; and adjusting timing of a communication between said first and second mobile stations based on the detection information of the locations of said first and second mobile stations.

10. A relay method according to claim 9, wherein said line control unit has a storage unit for storing the communication area locations where said first and second mobile stations are located and a timing control unit for adjusting timing of a communication between said first and second mobile stations, said timing adjusting step being a step of delaying the communication timing of said first mobile station based on the location information of the first mobile station from said storage unit.

11. A relay method in a digital radio communication system including a control station having a line control unit, at least one relay station and at least one mobile station, which is able to move between communication zones of said control station and said relay station, said method comprising the steps of:

determining whether said mobile station is in the zone of said control station when a communication is to be connected by said mobile station; and adding a delay in the timing of transmission of said communication based on information detected regarding the location of said mobile station relative to the zone of said control station.

12. A relay method according to claim 11, wherein said delay is so designed as to be equal to a difference between a line connection time of said control station with a first mobile station in the communication zone of said control station and a line connection time of said control station with a second mobile station located in the communication zone of said relay station via said relay station.

* * * * *